United States Patent [19]

Presley

[11] 4,387,328

[45] Jun. 7, 1983

[54] SHAPED VOLTAGE WAVEFORM MOTOR CONTROLLER

[75] Inventor: Rex W. Presley, Livonia, Mich.

[73] Assignee: The Bendix Corporation, Teterboro, N.J.

[21] Appl. No.: 258,719

[22] Filed: Apr. 29, 1981

[51] Int. Cl.$^3$ .............................................. G05B 19/40
[52] U.S. Cl. .................................. 318/696; 318/138; 318/254
[58] Field of Search ................ 318/138, 254, 696, 685

[56] References Cited

U.S. PATENT DOCUMENTS

| | | | |
|---|---|---|---|
| 3,577,049 | 5/1971 | Madurski | 318/138 |
| 3,626,269 | 12/1971 | Stanley | 318/696 |
| 4,035,708 | 7/1977 | Schaff | 318/696 |
| 4,107,595 | 8/1978 | Campe | 318/254 |
| 4,250,435 | 2/1981 | Alley et al. | 318/696 |

*Primary Examiner*—J. V. Truhe
*Assistant Examiner*—Forester W. Isen

*Attorney, Agent, or Firm*—Anthony F. Cuoco; Markell Seitzman

[57] ABSTRACT

A motor controller for a variable airgap motor. The controller includes first means responsive to a command signal for providing a first signal indicative of the absolute value of the command signal. The controller further includes a second means responsive to the first signal for limiting the rate of increase of the first signal from exceeding the acceleration capacity of the motor and third means for generating a direction signal indicative of the desired direction of rotation of the motor. The controller further includes pulse means responsive to the output of the second means for generating a train of pulse signals, the rate of which is indicative of the commanded speed. The controller further includes sequencing and driver means wherein the sequencing means is responsive to the pulse signals and the direction signal for generating a plurality of actuation signals one associated with each coil of the motor and wherein the driver means includes means for controlling the current flow through a determinable set of the motor coils.

5 Claims, 8 Drawing Figures

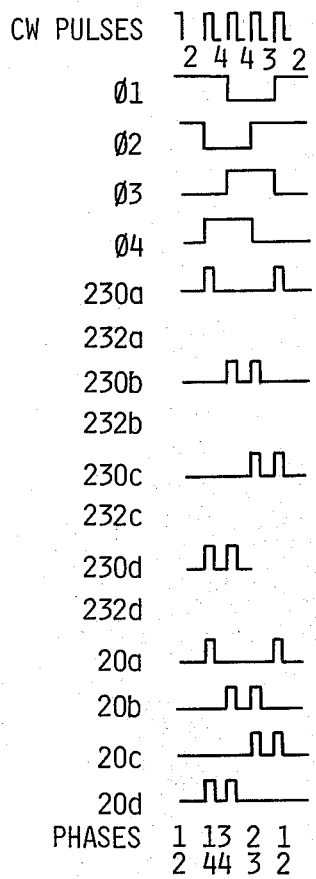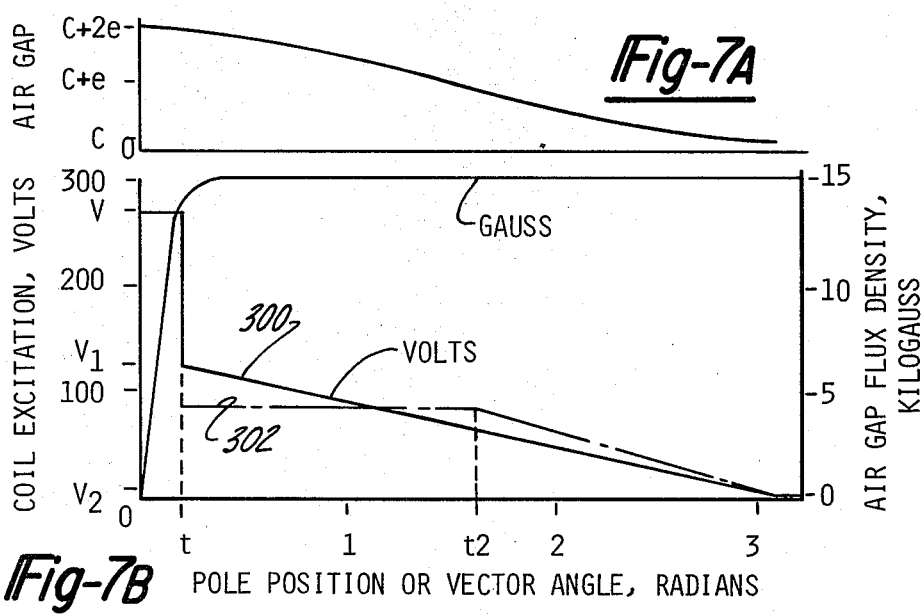

SHAPED VOLTAGE WAVEFORM MOTOR CONTROLLER

This invention relates to controllers for electromagnetic actuators such as step motors or self-commutated motors having varying air gaps.

One such variable air gap electromagnetic actuator is disclosed in U.S. Pat. No. 3,577,049 by Madurski et al and entitled, "Self-Commutated Electromotive Device".

The basic problems facing the designer of a controller for this type of electromagnetic actuator are the effects of the high inductance of the motor coils and the performance variations due to the variable air gap. The high inductance of the motor coils inhibits the rate of current build up and tends to develop a high surge voltage when the coil is turned off. It is well known that the current through an inductor cannot be changed instantaneously, consequently, there is a certain current flowing within the motor coil after a particular coil is shut off. The surge voltage represents stored energy which is wasted. This current or stored energy generates a negative torque which contributes to the inefficiency of the motor or actuator. The variable air gap contributes to the electric and magnetic over-saturation of the coils.

Prior art controllers have used capacitor voltage doubler circuits to provide an initial high voltage pulse to overdrive the motor coils for obtaining a fast coil turn-on response. However, overdriving the coils causes the coil to store energy and leads to a sluggish turn off response. To limit the stored energy in the coils prior art controllers have included surge suppression circuitry to aid in achieving a fast coil turn off response.

Because of the stored energy, current will flow through a particular coil during that part of the actuation cycle when it should be deactivated resulting in a torque loss or a negative torque. This negative torque is inversely related to the surge voltage. Therefore, it is desirable to make the surge voltage as high as the circuit components will withstand in order to reduce torque loss.

It is an object of the present invention to control the excitation current to a particular set of coils of a variable air gap actuator or motor to develop maximum torque. It is a further object of the present invention to control the excitation of the motor coils to increase the efficiency of operation of the motor and to decrease wasted power.

The feature of the present invention is a controller which incorporates therein a waveform generator which produces a shaped output voltage to excite a particular one of the motor coils in correspondence with its associated varying air gap.

According to the specific circuitry described and detailed below, the invention comprises a motor controller for a variable air gap motor. The motor includes a plurality of poles attached to a stator wherein each pole includes at least one electrical coil. The motor controller includes a first means that is responsive to a command signal which is indicative of the commanded speed of the motor for providing a first signal that is indicative of the absolute value of the command signal. The controller further includes second means responsive to the first signal for limiting the rate of increase of the first signal from exceeding the acceleration capacity of the motor and a third means, responsive to the command signal, for generating a direction signal indicative of the desired direction of rotation of the motor. The controller further includes pulse means responsive to the output of the second means for generating a train of pulse signals, the rate of which is indicative of the commanded speed. The controller further includes sequencing means and driver means wherein the sequencing means is responsive to the pulsed signals and the direction signal for generating a plurality of actuation signals one associated with each coil of the motor and wherein the driver means includes means for controlling the current flowing through a determinable set of coils in correspondence with the air gap associated therewith for varying the current through a particular coil at a level just above the level of current needed to magnetically saturate the pole associated with the particular one of the coils.

BRIEF DESCRIPTION OF THE DRAWINGS

In the drawings

FIG. 6 is a timing diagram for the circuit of FIG. 5.

FIGS. 7A and 7B illustrate the relationships between vector angle and air gap (FIG. 7A) and between vector angle and coil excitation (FIG. 7B).

DETAILED DESCRIPTION OF THE DRAWINGS

Figure 1:
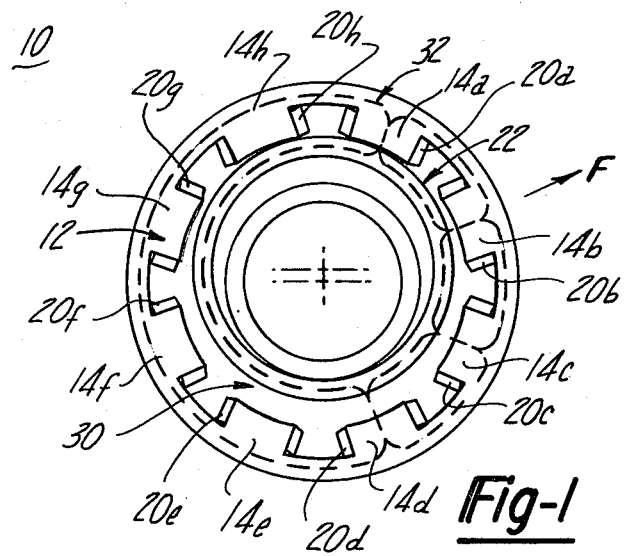
FIG. 1 is a cross-sectional view of a motor having eight poles.

With reference to the drawings, a motor or actuator indicated generally as 10, is illustrated in FIG. 1. The motor 10, has a stator 12 with eight poles 14a-h having wound thereon a particular electrical coil 20a-h. The stator is mounted in a fixed position in a known manner within the motor housing (not shown). The motor further includes an armature 22, movably disposed relative to the stator 12 and constrained to move in an orbiting manner with respect to the stator by an epicyclic transmission. The epicyclic or orbiting motion of the armature 22 relative to the stator 12 causes the air gap 30 between the armature and any particular pole 14a-h to vary with armature position.

The basic electromagnetic operation of the motor 10 is illustrated below. A typical mode of operation requires that one half of the motor coils 20 be energized at any particular time. As an example, assume that at one point in time exciting current is caused to flow through coils 20a-d. The magnetic lines of flux generally indicated as 32, cross the air gap 30 between the stator 12 and the armature 22 and create a radial force vector F, which acts upon the armature 22 in the direction shown in FIG. 1. The first electrical step input signal received from the controller will turn off coils 20a and b and turns on coils 20e and f. Upon the energization of coils 22e and f it can be shown that the force vector will rotate 90° clockwise. Subsequently, the coils 20c and d are turned off while coils 22g and h are turned on, thereby causing another 90° rotation of the force vector. This excitation sequence continues with one complete rotation of the force vector occuring for every four input step signals. The reaction of the force vector upon the armature 22 produces an orbiting motion of the armature relative to the stator 12 in a known manner. The direction of rotation of course may be reversed by reversing the sequence of excitation. Motors or actuators having epicyclic motion are illustrated by Madurski in U.S. Pat. No. 3,577,049 and by Presley in U.S. Ser. No. 230,161, filed Jan. 1, 1981 which are herein expressly incorporated by reference.

Figure 2:
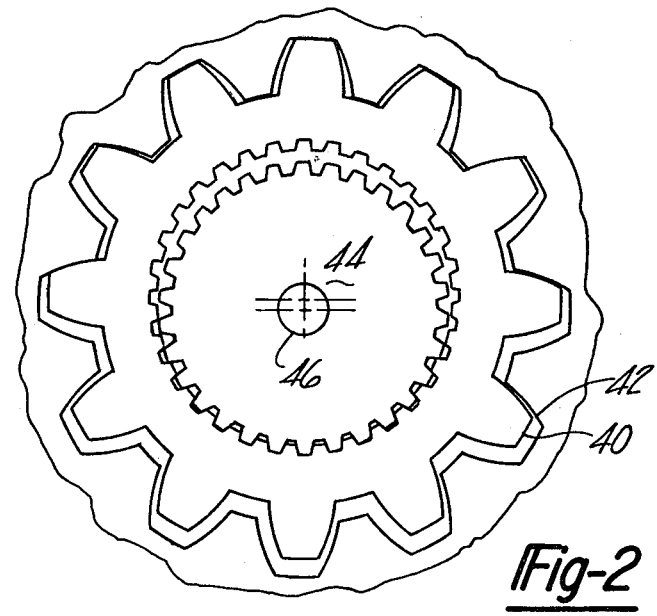
FIG. 2 illustrates the basic components of an epicyclic transmission.

The basic components of an epicyclic transmission are illustrated in FIG. 2. These components are a ring gear 40, a stationary or ground gear 42 which is mounted to a housing (not shown) and an output gear 44 that is concentrically positioned relative to the ground or stationary gear 42. The armature 22, illustrated in FIG. 1, is rigidly fasten to the ring gear 40. The stationary gear provides a means for producing the orbiting motion of the armature 22. This orbiting motion may comprise a displacement without rotation if both gears (40, 42) have exactly the same number of teeth or on a displacement plus rotation for other gear configurations. The internal portion of the ring gear 40 forms the transmission between the motor and the output shaft 46 or output gear 44. If the force vector on the ring gear 40, which corresponds to the force vector on the armature 22, is located approximately 90° from the ring gear and output gear contact point, the ring gear will move, thus turning the output gear and causing the contact point to move in a direction toward the force vector position. As the force vector rotates the output gear turns but at a much slower speed than the rotation of the force vector.

It should be appreciated that the type of motor or actuator such as a step motor or self commutated motor, or the number of coil within the motor do not represent limitations to the present invention. Those skilled in the art will appreciate that actuators having eight coils display an operational advantage of increased resolution, performance and efficiency as compared to a similar four pole (phase) motor, however, the eight phase motor and its corresponding controller requires more complex and sophisticated electronics and sequencing logic.

Figure 3:
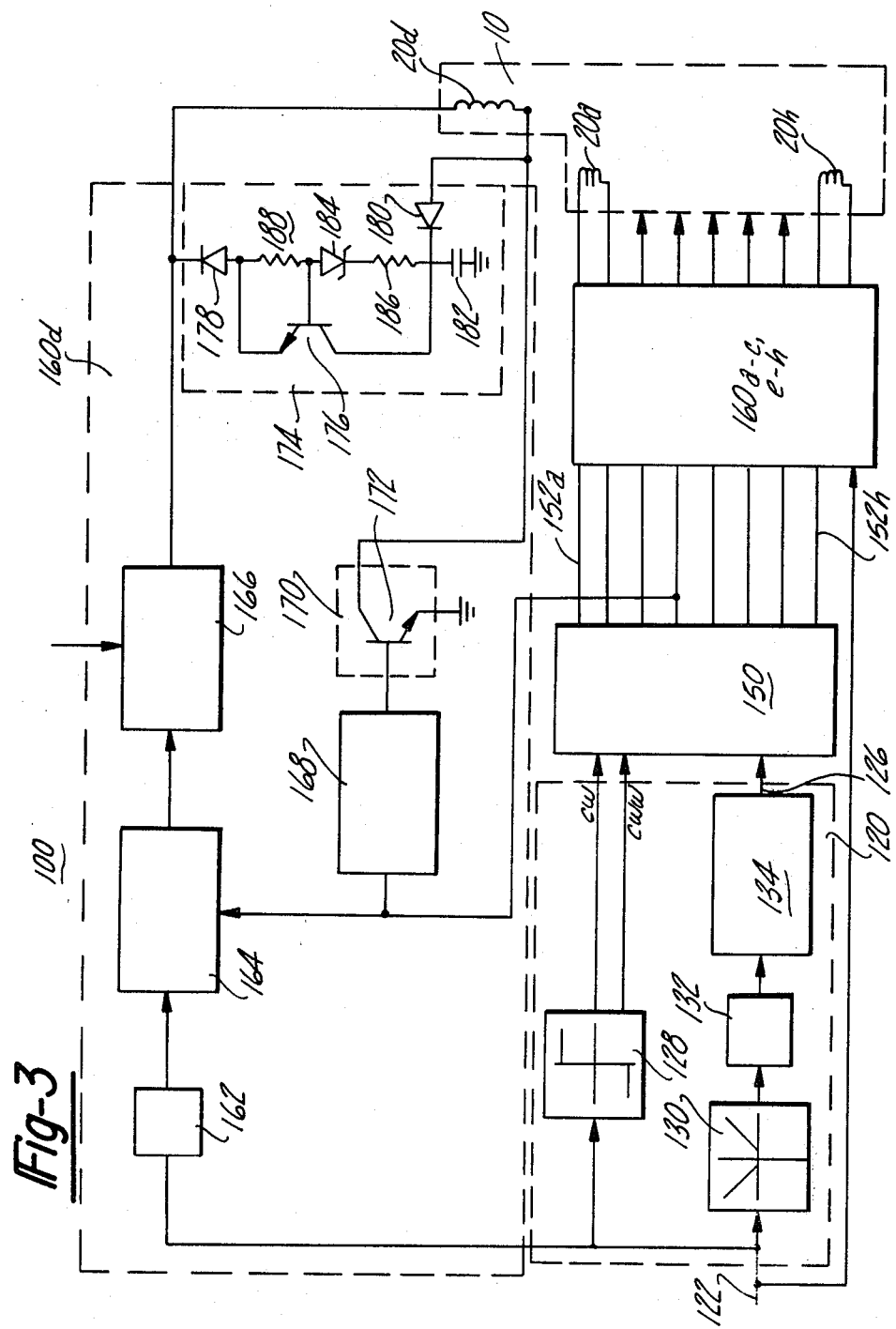
FIG. 3 is a block diagram illustrating the major components of the present invention.

Reference is made to FIG. 3 which illustrates the major components of the controller 100 of the present invention. The controller 100 comprises rate means 120, which is responsive to the command rate signal, on line 122. The output of the rate means 120 comprises a plurality of signals such as the clockwise (CW) and counterclockwise (CCW) direction of rotation signals on lines 124*a and b and a rate signal, on line 126, whose pulse rate is indicative of the commanded rate signal. In the embodiment of the invention illustrated in FIG. 3, the direction of rotation signals are generated by the saturation circuit 128 in correspondence with the polarity of the signal on line 122. The direction of rotation signal and the rate signal are input to the sequencing logic 150 via lines 124*a, b and 126. The sequencing logic generates a plurality of coil activation signals on lines 152a-h. These coil activation signals, as well as the input command rate signal from line 122 are input to a plurality of driver circuits 160, one associated with each coil 20 of the motor 10, to selectively excite particular sets of the coils 20a-h in a particular sequence.

The rate means 120 comprises an absolute value and threshold circuit 130, the output of which is connected to a means for limiting the commanded motor speed to the maximum speed that is attainable by the motor in a loaded condition. This last named means is generally designated as circuit 132. The circuit 132 in the preferred embodiment may further includes means for limiting the rate of increase of the commanded speed to prevent the activation signal (i.e., the output from the sequencing logic 150) to the coils of the motor from exceeding the acceleration capability of the motor 101 in its loaded configuration. In its simplest embodiment, the circuit 132 may be a gain (K). Alternatively, acceleration limiting can be accomplished by including within the circuit 132 a lag circuit. While the preferred embodiment of the invention uses analog circuitry, a digitally programmed acceleration limiter may be substituted therefor to accomplish both the absolute value and threshold circuit 130 and the gain and acceleration limiting of the circuit 132. The output signal of the circuit 132 is a signal which is proportional to the input command signal but insensitive to its polarity. The output of circuit 132 is connected to an analog to pulse rate converter 134 of a known variety which produces on line 126 a pulsed signal, the pulse rate frequency of which is proportional to the absolute value of the commanded signal.

Figure 4:
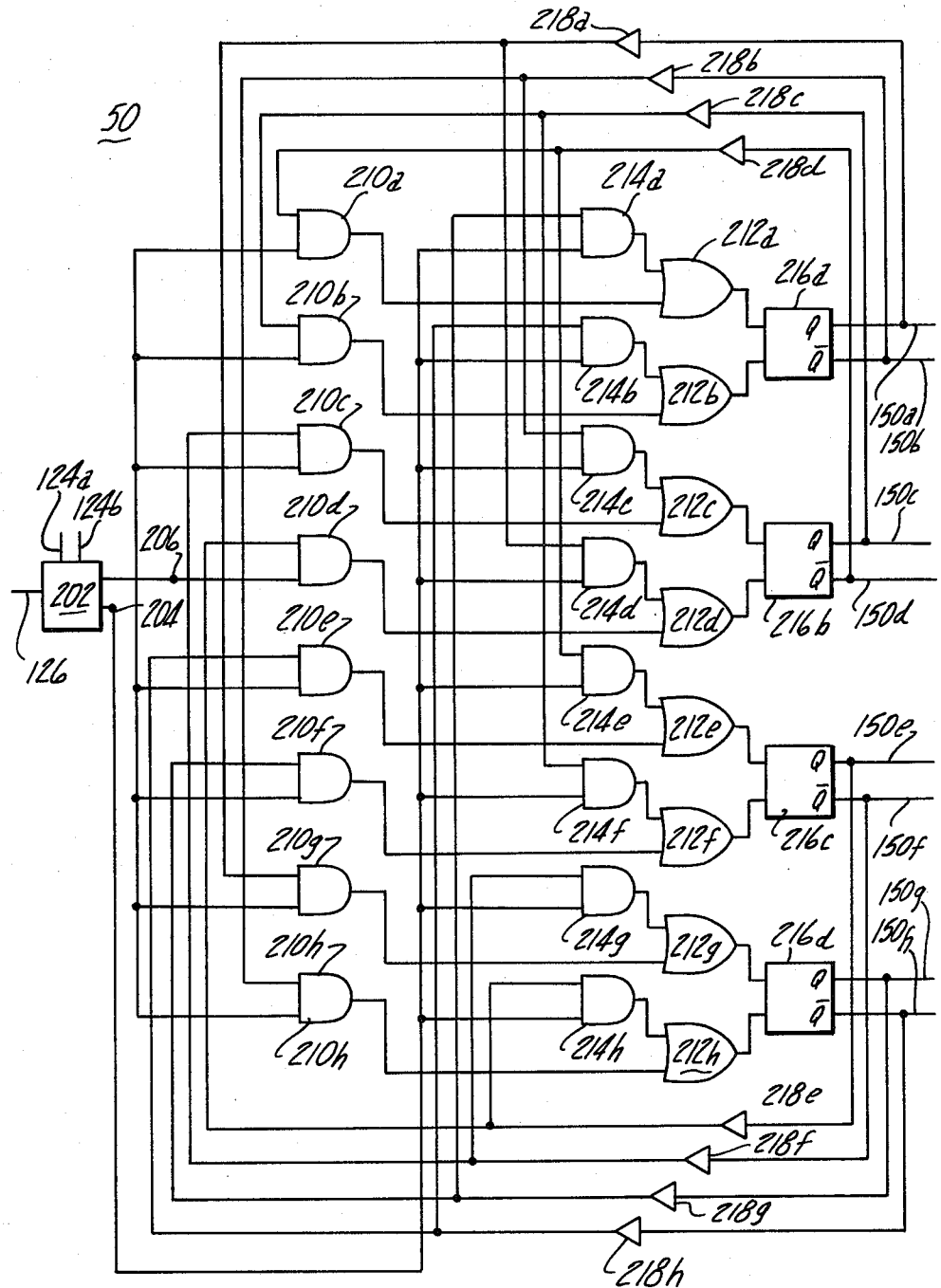
FIG. 4 illustrates stepping logic for an eight pole stepping motor.

Reference is now made to FIG. 4 and to Table 1 which illustrates the sequencing logic 150 for an eight phase stepping motor and the desired coil excitation sequence for both clockwise and counterclockwise motion as a function of the number of command step signals or pulses. The sequencing logic 150 comprises a solid state switch 202 which receives at its input terminals the direction of rotation signals indicative of the clockwise and counterclockwise desired rotation of the motor from line 124 a and b. In addition, the switch 202 receives the output of the converter 120 from line 126. The output of the switch 202 selectively communicates the pulsed signal from line 126 to the terminals 204 or 206 in correspondence with the direction of rotation signals. If the input pulse signal from line 122 is communicated to terminal 204, the stepping motor will initiate a clockwise rotation and if the pulsed signal is communicated to terminal 206 the motor 10 will initiate a counterclockwise motion sequence as illustrated in Table 1.

TABLE 1

SEQUENCE OF COIL EXCITATION FOR 8 PHASE MOTOR OPERATION

| | STEP No. | COIL EXCITATION - 20 | | | | | | | |
|---|---|---|---|---|---|---|---|---|---|
| | | a | b | c | d | e | f | g | h |
| CW | 1 | V | V | V | V | | | | |
| | 2 | | V | V | V | V | | | |
| | 3 | | | V | V | V | V | | |
| | 4 | | | | V | V | V | V | |
| | 5 | | | | | V | V | V | V |
| | 6 | V | | | | | V | V | V |
| | 7 | V | V | | | | | V | V |
| | 8 | V | V | V | | | | | V |
| CCW | 1 | V | V | V | V | | | | |
| | 2 | V | V | V | | | | | V |
| | 3 | V | V | | | | | V | V |
| | 4 | V | | | | | V | V | V |
| | 5 | | | | | V | V | V | V |
| | 6 | | | | V | V | V | V | |
| | 7 | | | V | V | V | V | | |
| | 8 | | V | V | V | V | | | |

Reference is again made to Table 1 which illustrates the coil excitation sequence as a function of the number of pulses received at either terminal 204 or 206. It should be noted that the sequencing logic 150 of FIG. 4 will simultaneously excite four of the eight coils in a predetermined order to saturate their corresponding magnetic poles thus generating a maximum torque.

A detailed discussion of a typical driver circuit as shown in FIG. 3 follows below. The pulses indicative of counterclockwise motion are received from line 126 are communicated by the operation of switch 202 to terminal 206 and to one terminal of a plurality of eight AND gates 210a-h. The output of these AND gates 210a-h are respectively communicated to a plurality of OR gates 212a-h. The clockwise pulses received at input terminal 204 are similarly communicated to one of the input terminals of a second plurality of AND gates 214a-h. The output of each AND gate 214a-h is connected to another input terminal of a respective one of the OR gates 212a-h. The output of the OR gates 212a, 212c, 212e, and 212g are communicated to the set terminal of a respective one of the flip-flops 216a-d. The output of the OR gates 212b, 212d, 212f, and 212h are communicated to the set terminal of one of the flip-flops 216a-d. The output of these flip-flops comprise the eight coil activation signals. The output of flip-flop 216a corresponds to the activation signals for coils 20a and 20e which are placed upon lines 150a and b. The outputs of flip-flop 210b correspond to the activation coil signals for coils 20b and 20f (lines 150c and d), while the output of flip-flop 216c corresponds to the activation signals for coils 20c and 20g (lines 150e and f). Finally, the output of flip-flop 216d corresponds to the activation signals for coils 20d and 20h and are placed upon lines 150g and h respectively. Each of the coil activation signals are passed through a plurality of inverters 218a-h and connected, as indicated, to the input terminals of the AND gates 210a-h and 214a-h. The output terminals of the flip-flops 216a-d are connected via lines 150a-h to a driver circuit 152a-h.

Figure 5:
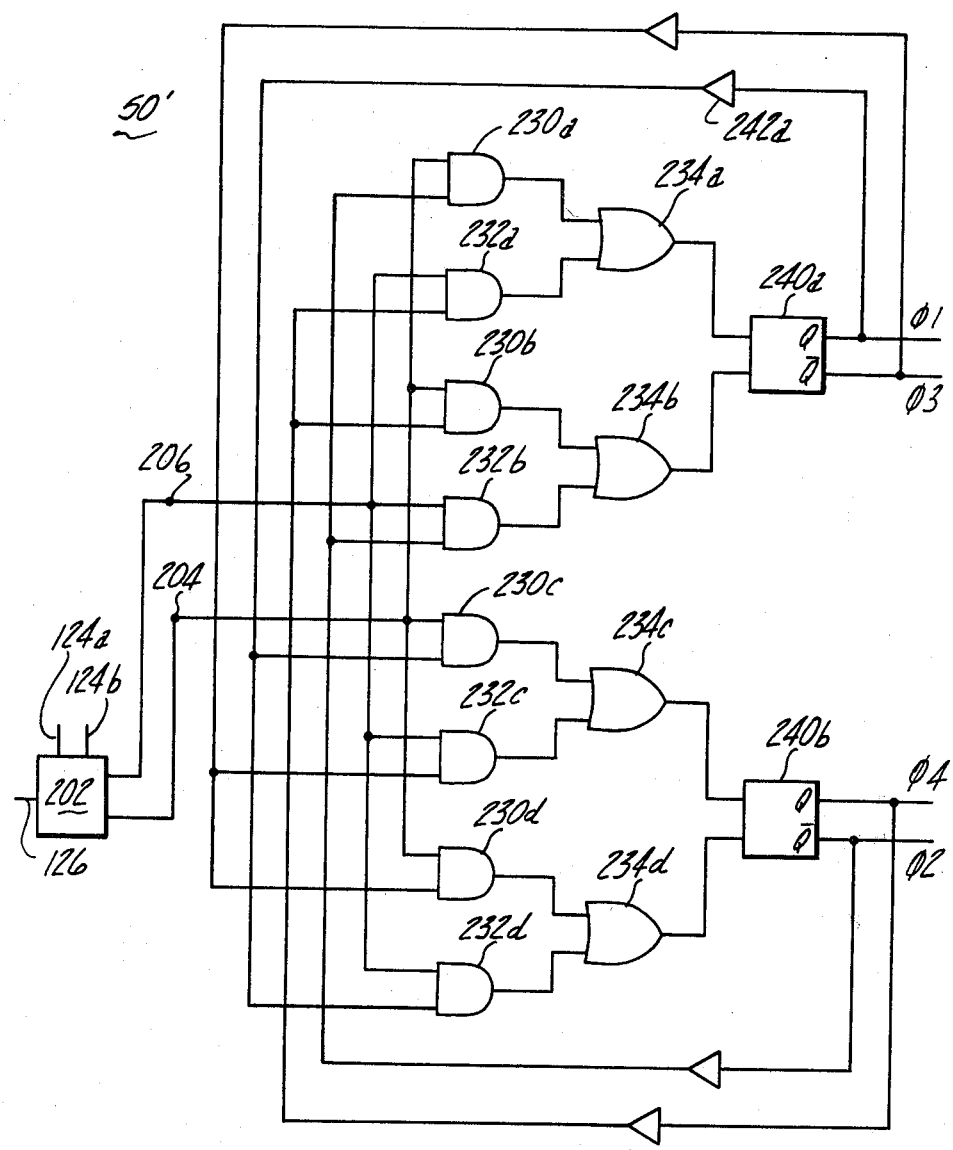
FIG. 5 illustrates stepping motor logic for a four phase stepping motor.

Reference is now made to FIGS. 5 and 6 which illustrate the sequencing logic 150' for a four pole or four phase step motor and a timing diagram illustrating the signal sequence generated by the circuit shown in FIG. 5. Table 2 illustrates the desired excitation sequence as a function of the number of input pulses. As illustrated in Table 2 and in the accompanying timing diagram, two of the four coils are activated at any one time.

The sequencing logic 150' illustrated in FIG. 5 comprises a solid state switch 202 which is identical to the solid state switch previously discussed in conjunction with FIG. 4. The output signals of the solid state switch 202 are similarly communicated to input terminals 204 and 206 of the sequencing logic. Terminal 204 is connected to one of the input terminals of the AND gates 230a-d while terminal 206 is connected to one of the input terminals of a second plurality of the AND gates 232a-d. The output terminals of the AND gates 230 and 232 are respectively connected to one of the four OR gates 234a-d. The output of the OR gate 234a and 234c are connected to the set terminal of the flip-flops 240a and 240b, respectively. The output of the OR gates 234b and 234d are connected to the reset terminal of the flip-flops 240. The noninverted output of flip-flop 240a is connected to the input of the AND gates 230c and 232d through an inverter 242a. The inverted output of flip-flop 240a is connected to the AND gates 232c and 230d through the inverters 242c. The non-inverted output of flip-flop 240b is connected via the inverter 242b to the AND gates 232a and 230b while the inverted output of flip-flop 240b is connected to the AND gate 230 and 232b through the inverter 242d.

TABLE 2

SEQUENCE OF COIL EXCITATION FOR 4 PHASE MOTOR OPERATION

| STEP | | COIL EXCITATION - 20 | | | |
|---|---|---|---|---|---|
| | No. | a | b | c | d |
| CW | 1 | V | V | | |
| | 2 | | V | V | |
| | 3 | | | V | V |
| | 4 | V | | | V |
| CCW | 1 | V | | | V |
| | 2 | | | V | V |
| | 3 | | V | V | |
| | 4 | V | V | | |

Reference is briefly made to FIG. 6 which is a timing diagram which illustrates the clockwise coil activivation sequence produce by the sequencing logic 150' of FIG. 5.

Inasmuch as the operation of each drive circuit 160 is identical, the following disussion is directed to a representative drive circuit such as 160d as shown in FIG. 3. Driver circuit 160d has been chose for discussion since the air gap 30 associated with coil 20d, as illustrated in FIG. 1, is approximately at a maximum. In addition, the reference letters a-h will be dropped where appropriate. Each coil 20a-h is activated for one half of a cycle or 180° of orbit of the armature 22. The controller 160 will generate a sufficient current to magnetically saturate four of the poles 14a-h to generate a maximum torque, however, since the current needed to saturate a particular pole varies inversely with its corresponding air gap the controller 160 functions to reduce the excitation current to the poles, as the air gap varies to reduce the stored energy in the motor and reduce the electrical power that is wasted.

The input signals received by the driver circuit 160d are the command signal from line 122 and an activation signal which is received from sequencing logic 150 on line 152d. The command signal is received by an analog to digital converter 162. The output of the converter 162 is connected to a waveform generator 164. The waveform generator 164 also receives a respective coil activation signal via line 150d. The details of the waveform generator will be discussed below. The output of the waveform generator 164 is connected to the pulse width modulator 166 which produces a variable duty cycle mode of operation to reduce the power requirements of the coil 20d. The output of the pulse width modulator 166 generates a coil voltage signal in correspondence with the shaped voltage output of the waveform generator 164. The output of the modulator 166 is connected to one coil such as coil 20d of the motor 10.

The coil activation signal, in addition to being received by the waveform generator 164, is connected to a buffer or pre-amplifier 168 the output of which is connected to a switch 170 which may comprise a transistor 172. The output of the switch 170 is connected to the grounded terminal of a coil 20 such as coil 20d.

Reference is briefly made to the surge suppression circuitry 174. The voltage suppression circuit 174 is connected in parallel about the coil 20d. This circuitry 174 comprises a transistor 176 having its emitter connected to the output of the modulator 166 and one terminal of the coil 20d through a diode 178. The collector of transistor 176 is connected to the other terminal of the coil 20d through a second diode 180 and to ground through capacitor 182. The base of transistor 176 is connected to its collector terminal through the zener diode 184 and resistor 186 combination. The base terminal is also connected to its emitter terminal through resistor 188.

Reference is briefly made to FIG. 7a which illustrates the variation of the air gap between the armature 22 and the pole face of any particular stator pole 14a-h. The magnitude of the air gap varies as a function of the position of the armature relative to the stator from a magnitude of C+2e to the value of C wherein C corresponds to the average nominal air gap and where e is the eccentricity of the placement of the armature 22 relative to axis of the output shaft 46.

Reference is now briefly made to FIG. 1 and to FIG. 7b which illustrates the relationship of the armature 22 to the plurality of stator poles 14. In this position the electromagnetic coils 20a-d are activated. It should be noted that in this position the air gap between the stator poles 14d and 14e and the armature 22 is substantially at its maximum and would correspond to the value of C+2e as illustrated in FIG. 7a. When the armature 22 is in the position as indicated in FIG. 1 the sequencing logic 150' will generate on line 152d an activation signal which will remain high for one half of an orbit of the armature or for 180°. This activation signal is transmitted as previously mentioned to the waveform generator 164 and to the preamplifier 168. In response to the output of the preamplifier 168 the switch 170 is made conductive therein providing a charging path for the coil 20d. In response to the activation signal and to the digital output of the converter 162 the waveform generator 164 will generate the shaped waveform of FIG. 7b designated as 300 over the ensuing one half revolution of the armature 22. Utilizing the speed information inherent in the output of the analog to digital converter 162 the waveform 300 (of FIG. 7b) may be generated as a function of speed or time. To generate the maximum torque the waveform generator will generate the waveform 300 having a first voltage signal V which is sufficient to magnetically saturate a particular coil at its maximum air gap. As the armature moves the air gap associated with a particular activated pole 14 will be reduced as illustrated in FIG. 7a. In correspondence to this reduced air gap the waveform generator will generate an output voltage of such magnitude that the current applied to the coil 20d will vary. Ideally, this variation of the coil current will vary inversely with air gap. In the embodiment illustrated in FIG. 7b the waveform generator would reduce the magnitude of voltage at time T1 to a reduced level such as $V_1$ and thereafter linerally reduce the output voltage with time to a determinable value of V2 at the 180° position point. The initial high voltage, V, causes the current to build up rapidly to the value required for saturating the poles of the stator. Then, as the voltage is decreased, the stored energy in the coil helps to maintain the current at the desired value. As previously mentioned, the current needed to maintain saturation decreases as the gap decreases. It has been found that the time T1 can be approximately 7 milliseconds and that the reduced value of voltage $V_1$ can be approximately 100 to 150 volts while the value of voltage V2 can be in the vicinity of 5 volts. An alternate excitation sequence can be generated by the waveform generator and is illustrated by the dotted line 302. The voltage waveform shown by the dotted line 302 was shown by computer studies to be more efficient than the voltage shown by line 300. During the first part of the cycle the gap does not change much, and the voltage can be held constant. Then the voltage is reduced at a controlled rate with the stored energy helping to maintain the current, so that the stored energy is nearly dissipated at coil cut off.

In this manner by initially applying a high voltage value V to the coil and thereafter reducing the coil voltage reduces the back emf and negative torque associated with the prior art and provides for optimum performance of an electric actuator.

While the preferred embodiment of the invention has been described in conjunction with a step motor as previously mentioned, the invention can be used in conjunction with a self-commutated motor which would include a plurality of variable reluctance sensors to measure the air gap between the armature and the stator poles of the motor. The variable reluctance sensors are used, in a known manner, to identify the particular stator pole and coil that should be activated.

Many changes and modifications in the above described embodiments of the invention can of course be carried out without department from the scope thereof. Accordingly, that scope is intended to be limited only by the scope of the appended claims.

Having thus described the invention, what is claimed is:

1. In combination a motor controller and a variable air gap motor (10) having a plurality of poles (14) and at least one coil (20) associated with each said poles, comprising:

first means (130) responsive to a command signal indicative of the commanded speed of the motor for providing a first signal indicative of the absolute value of the command signal;

second means (132), responsive to the first signal, for limiting the rate of increase of said first signal from exceeding the acceleration capability of said motor;

third means (128) responsive to said command signal for generating a direction signal indicative of the desired direction of rotation of said motor;

pulse means, responsive to the output of said second means for generating a train of pulsed signals indicative of the commanded speed;

sequencing means (150), responsive to said pulsed signals and said direction signal for generating a plurality of activation signals, one associated with each coil of said motor, to activate said coil;

driver means (160), one associated with each coil, responsive to said command signal for controlling the current flowing through a predetermined set of said coils in correspondence with the air gap associated therewith by varying the current through a particular coil at a level just above that needed to magnetically saturate said pole associated with a particular one of said coils.

2. The controller as defined in claim 1 wherein said driver means further includes:

means for developing a signal having means for generating a first level signal to saturate a particular one of said coils, for reducing said voltage signal to a second level corresponding to a voltage slightly greater than that necessary to maintain saturation and for thereafter reducing said signal linearly in proportion to the speed of rotation of said motor.

3. The controller as defined in claim 2 wherein said driver means comprises:

A/D converter (162) means for generating a digital signal corresponding to said command signal;

waveform generator means (164), responsive to said digital signal and a particular one of the activation signals of said sequencing means, for generating a time dependent activation voltage signal for a particular one of said coils in correspondence with its associated air gap; and, pulse width modulator means (166), for generating a pulse width signal in response to the output of waveform generator means.

4. The controller as defined in claim 3 further including:

switch means responsive to a particular one of the activation signals, connected to a terminal of said coil for selectively creating a current flow path for the coil current, said switch means further having an input terminal;

surge suppression means connected in parallel across the terminals of said coil for limiting the voltage generated after turning off said switch means; and buffer means, connected between said sequencing means and the input to said switch means for buffering a particular one of the activation signals.

5. The controller as defined in claim 4 wherein said switch means includes a transistor having its base terminal connected to said buffer means, its collector terminal connected to said second terminal of said coil and its emitter terminal connected to ground potential.

* * * * *